(12) United States Patent
Namboodiri et al.

(10) Patent No.: US 9,042,681 B1
(45) Date of Patent: May 26, 2015

(54) INTERPOLATED VIDEO ERROR CONCEALMENT

(71) Applicant: Marvell International Ltd., Hamilton (BM)

(72) Inventors: Vipin Namboodiri, Bangalore (IN); Krishna Prasad Agara Venkatesha Rao, Bengaluru (IN)

(73) Assignee: Marvell International Ltd., Hamilton (BM)

( * ) Notice: Subject to any disclaimer, the term of this patent is extended or adjusted under 35 U.S.C. 154(b) by 232 days.

(21) Appl. No.: 13/722,700

(22) Filed: Dec. 20, 2012

Related U.S. Application Data

(60) Provisional application No. 61/582,473, filed on Jan. 2, 2012.

(51) Int. Cl.
*G06K 9/32* (2006.01)
*H04N 7/01* (2006.01)

(52) U.S. Cl.
CPC .................................. *H04N 7/014* (2013.01)

(58) Field of Classification Search
CPC ..... G06T 3/4007; G06T 3/4084; G06T 5/002; G06T 5/50; G06T 7/2013; G06T 7/2073; H04N 5/145; H04N 5/213; H04N 7/0115; H04N 7/012; H04N 7/0125; H04N 7/0127; H04N 7/0135; H04N 7/0137; H04N 7/014; H04N 7/0142; H04N 19/006; H04N 19/00066; H04N 19/00278; H04N 19/00436; H04N 19/00442; H04N 19/00545; H04N 19/00587; H04N 19/00612; H04N 19/00648; H04N 19/00684; H04N 19/00703; H04N 19/00715; H04N 19/00733; H04N 19/00751; H04N 19/0089; H04N 19/00787; H04N 21/234327
See application file for complete search history.

(56) References Cited

U.S. PATENT DOCUMENTS

| | | | |
|---|---|---|---|
| 7,129,987 B1 | 10/2006 | Westwater | |
| 7,203,235 B2* | 4/2007 | Huang et al. | 375/240.11 |
| 8,768,103 B2* | 7/2014 | Ogino et al. | 382/300 |
| 2008/0231745 A1 | 9/2008 | Ogino et al. | |

* cited by examiner

*Primary Examiner* — Jose Couso

(57) ABSTRACT

Embodiments of the present disclosure provide a method that comprises receiving a motion-interpolated pixel of an interpolated video frame, wherein the motion-interpolated pixel is based at least in part on a pair of anchor video frames. The method further comprises blending the motion-interpolated pixel with one or more anchor pixels of the pair of anchor video frames to produce a temporally filtered pixel, wherein the one or more anchor pixels correspond in position to the motion-interpolated pixel of the interpolated video frame. The method also comprises substituting the temporally filtered pixel for the motion-interpolated pixel in the interpolated video frame.

20 Claims, 4 Drawing Sheets

INTERPOLATED VIDEO ERROR CONCEALMENT

CROSS-REFERENCE TO RELATED APPLICATION

The present disclosure claims priority to U.S. Provisional Patent Application No. 61/582,473, filed on Jan. 2, 2012, which is incorporated herein by reference.

TECHNICAL FIELD

Embodiments of the present disclosure relate to the field of video frame interpolation, and more particularly to techniques, devices, and systems for mitigating errors in video frame interpolation.

BACKGROUND

Up-conversion of video streams uses frame interpolation to insert intermediate frames between original frames of a video stream. For example, up-converting a video stream from 24 frames per second (fps), as in conventional analog video, to 120 fps, as in high-definition television, is performed by inserting four intermediate frames between consecutive or temporally adjacent frames of the original video stream.

Intermediate frames can be interpolated based on analyzed motions of pixels between two adjacent frames of an original video stream. However, certain situations make such interpolation difficult. In particular, movement of a foreground object relative to a background image may result in image pixels that are visible in only one of the two adjacent video frames. This may be caused by factors such as reveal and occlusion of background regions, as well as by object deformations.

The embodiments described below conceal errors at a per-pixel level. The pooling of per-pixel errors is limited to a small region in the neighborhood and therefore may be called "local error concealment" strategies. These strategies, together with other strategies that may be applied on a more global basis, help reduce visible artifacts in motion compensated up-conversion systems.

Errors in motion based up-conversion occur on account of inaccurate handling of reveal and occluded regions, object deformations, situations where object motion is larger than the motion search range, etc. Of specific interest are situations where the region of error is limited to a small area of the screen. These errors can be hidden with robust local error concealment strategies as described below.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In one embodiment, a method comprises receiving a motion-interpolated pixel of an interpolated video frame, wherein the motion-interpolated pixel is based at least in part on a pair of anchor video frames. The method further comprises blending the motion-interpolated pixel with one or more anchor pixels of the pair of anchor video frames to produce a temporally filtered pixel, wherein the one or more anchor pixels correspond in position to the motion-interpolated pixel of the interpolated video frame. The method also comprises substituting the temporally filtered pixel for the motion-interpolated pixel in the interpolated video frame.

In certain embodiments, the method may further comprise spatially filtering the temporally filtered pixel based on pixels that surround the temporally filtered pixel in the interpolated video frame. The method may further comprise Gaussian filtering individual pixels of the interpolated video frame prior to the blending.

Blending the motion-interpolated pixel with the one or more anchor pixels may comprise weighting the motion-interpolated pixel relative to the one or more anchor pixels based at least in part on an evaluated interpolation quality of the motion-interpolated pixel.

The method may further comprise blending a first anchor pixel and a second anchor pixel to produce a blended anchor pixel. The first anchor pixel is from a first of the pair of anchor frames and the second anchor pixel is from a second of the pair of anchor frames. The first and second anchor pixels correspond in position to the motion-interpolated pixel of the interpolated video frame. Blending the motion-interpolated pixel with the one or more anchor pixels may comprise blending the motion-interpolated pixel with the blended anchor pixel.

In a further embodiment, one or more computer-readable storage media store instructions that are executable to perform actions comprising receiving a motion-interpolated pixel of an interpolated video frame, wherein the motion-interpolated pixel is based at least in part on a pair of anchor video frames. The actions further comprise blending the motion-interpolated pixel with one or more of the anchor pixels of the pair of anchor video frames to produce a temporally filtered pixel. The one or more anchor pixels correspond in position to the motion-interpolated pixel of the interpolated video frame. The actions further comprise substituting the temporally filtered pixel for the motion-interpolated pixel in the interpolated video frame.

In another embodiment, a video system comprises a conversion engine configured to generate interpolated frames for up-scaling an original video stream. The conversion engine is further configured to receive a motion-interpolated pixel of an interpolated video frame, in which the motion-interpolated pixel is based at least in part on a pair of anchor video frames of the original video stream. The conversion engine is also configured to blend the motion-interpolated pixel with one or more anchor pixels of the pair of anchor video frames to produce a temporally filtered pixel. The one or more anchor pixels correspond in position to the motion-interpolated pixel of the interpolated video frame. The conversion engine is further configured to substitute the temporally filtered pixel for the motion-interpolated pixel in the interpolated video frame.

BRIEF DESCRIPTION OF THE DRAWINGS

Embodiments of the present disclosure will be readily understood by the following detailed description in conjunction with the accompanying drawings. To facilitate this description, like reference numerals designate like structural elements.

DETAILED DESCRIPTION OF EMBODIMENTS OF THE DISCLOSURE

Video systems according to the present disclosure generate interpolated frames for use in video frame rate up-conversion. The interpolated frames are then filtered to remove or reduce the visual impact of artifacts that may be caused by interpolation errors, which may result from factors such as regions that are revealed, occluded, deformed with regard to a pair of adjacent frames of the original video stream.

A motion-interpolated frame is generated based on a pair of adjacent frames of an original video stream, referred to as anchor frames. Quality of interpolation is evaluated with respect to each pixel of the motion-interpolated frame.

Each pixel of the motion-interpolated frame is then filtered, using one or more different types of filters. The degree or aggressiveness of the filtering with respect to a particular pixel is based on the observed interpolation quality of that pixel. For pixels that have a relatively high observed interpolation quality, little or no filtering is applied. As interpolation quality decreases, however, increasingly greater degrees of filtering are applied.

Frame Interpolation and Filtering

Figure 1:
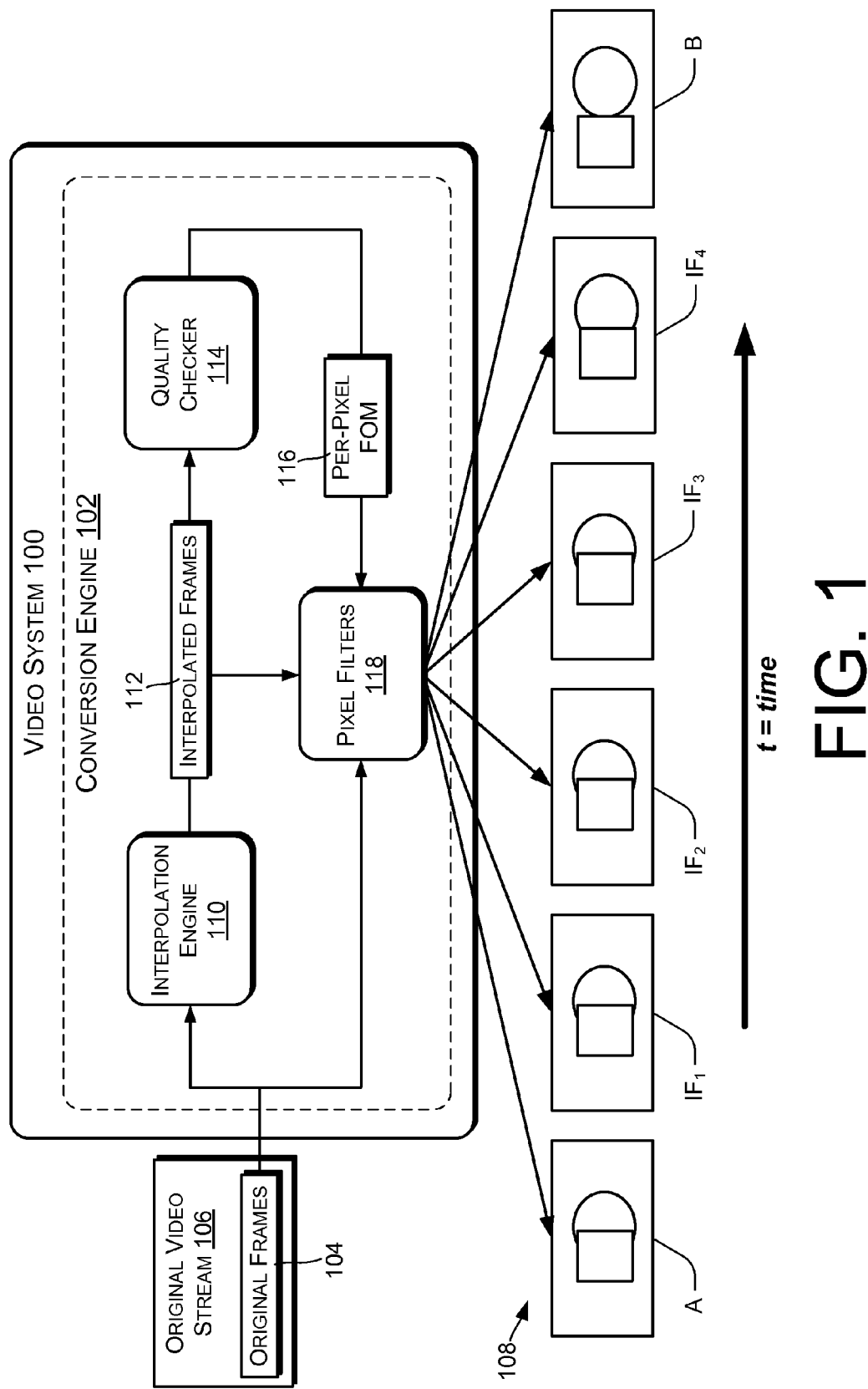
FIG. 1 is a schematic diagram of an example video system that performs frame rate up-conversion.
Figure 6:
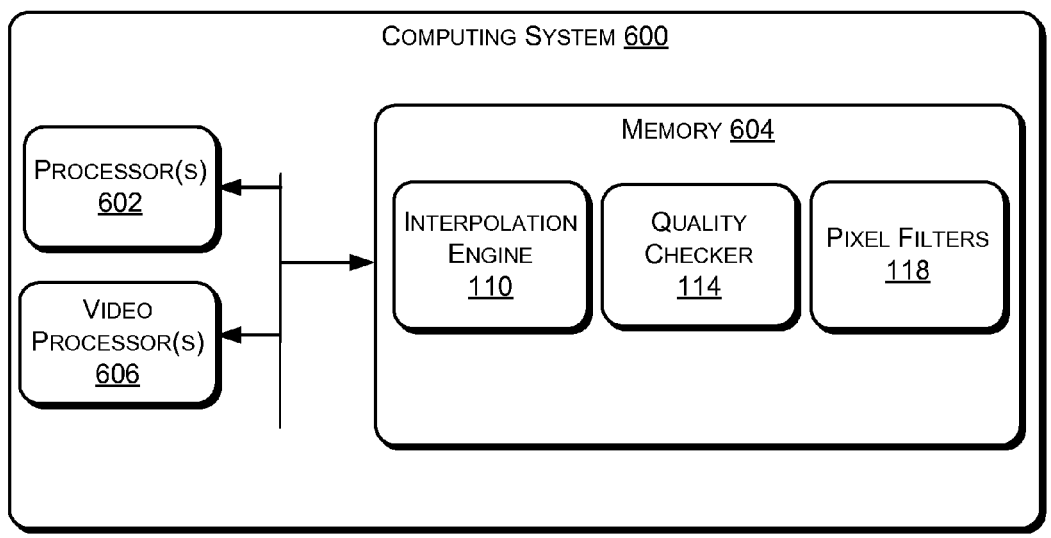
FIG. 6 is a block diagram of an example computing system usable to implement a software-based video system according to embodiments.

FIG. 1 is a schematic diagram of an example video system 100 for filtering interpolated video frames based on an interpolation quality metric associated with each pixel of the interpolated video frames. One or more aspects of the video system 100 may be implemented in hardware or a combination of hardware and software. The video system 100 may be implemented within a video card, as part of a system on a chip, as a series of discrete hardware components, as one or more application specific integrated circuits (ASICs), as one or more field programmable gate arrays (FPGAs), or other hardware-based solutions. One or more components of the video system 100 may be software-based, such as may be stored in firmware in read-only memory (ROM) or flash memory, and configured to be executable by one or more processors. A software-implemented video system is illustrated in FIG. 6.

The video system 100 includes a conversion engine 102 that receives a plurality of frames 104 from an original video stream 106 having a first frame rate. The conversion engine 102 is configured to perform frame rate up-conversion, to produce an up-converted video stream 108 having a second frame rate that is higher than the first frame rate of the original video stream 106. For example, the first frame rate might be 24 frames per second (fps), and the second frame rate might be 120 fps.

In the example shown in FIG. 1, frames A and B of the up-converted video stream 108 are adjacent frames of the original video stream 106, which are referred to as anchor frames. The anchor frame A immediately precedes the anchor frame B in the original video stream 106. In this example, four intermediate frames $IF_1$, $IF_2$, $IF_3$, and $IF_4$ (referred to collectively as $IF_x$) are inserted between the original frames A and B of the original video stream 106. One or more of the intermediate frames $IF_x$ may comprise an interpolated video frame.

The conversion engine 102 comprises a frame interpolator or interpolation engine 110 that is responsive to the original frames 104 to generate one or more motion-interpolated frames 112. The interpolation engine 110 may use various techniques for generating the motion-interpolated frames 112, including motion estimation schemes and bi-directional motion estimation schemes.

The conversion engine 102 further comprises an interpolation quality checker 114, which evaluates each motion-interpolated frame 112 as or after it is produced to determine quality of interpolation with respect each pixel of the motion-interpolated frame 112. The observed or evaluated interpolation qualities are quantified as a per-pixel figure of merit (FOM) 116. A FOM 116 is generated for each pixel of a motion-interpolated frame 112.

Per-pixel interpolation quality may be based on one or more factors or characteristics, which will be described in more detail below. As an example, the FOM 116 may be determined based on evaluated interpolation errors and/or the accuracy of one or more occlusion or reveal regions of the one or more interpolated frames 112.

The conversion engine 102 has one or more pixel filters 118, which are responsive to the per-pixel FOMs 116 to filter pixels of individual interpolated frames 112 with varying degrees of aggressiveness. When the FOM 116 for a particular pixel is high, indicating high interpolation quality, filtering may be omitted or performed with a very low degree of aggressiveness. When the FOM 116 for a particular pixel is low, indicating low interpolation quality, filtering may be performed with a very high degree of aggressiveness. At intermediate values of FOM 116, pixels may be filtered with an intermediate degree of aggressiveness.

Figure 2:
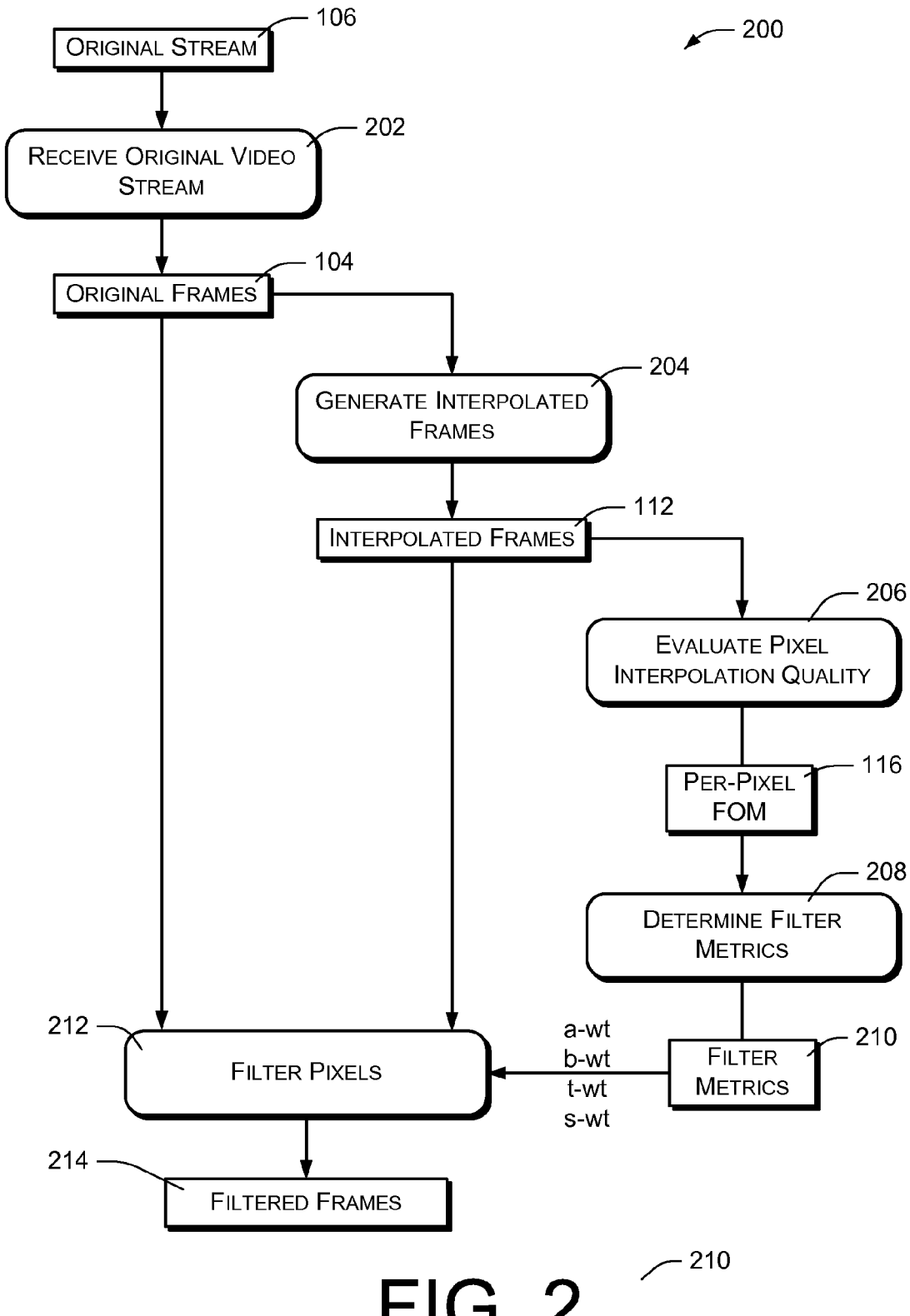
FIG. 2 is a flowchart showing an example process of filtering pixels of an interpolated video frame to mitigate effects of observed interpolation errors.

FIG. 2 illustrates an example method 200 of up-converting a video stream while mitigating the visual impact of interpolation errors. The example method 200 is discussed with reference to the environment of FIG. 1, although the method 200 may also be implemented in other environments.

At 202 the original video stream 106 is received. The original video stream comprises a sequence of original video frames 104. At 204, one or more interpolated frames 112 are generated based on the original frames 104. At 206 a motion-interpolated pixel of the interpolated video frame is received and evaluated to determine the quality of its interpolation. This includes calculating or producing the interpolation quality indicator or FOM 116. An FOM 116 is produced for each pixel of an interpolated frame 112.

At 208, filter metrics 210 are specified, based at least in part on the FOM 116. The filter metrics 210 may include an a-wt metric corresponding to a blending weight for a pixel of the A anchor frame, a b-wt metric corresponding to a blending weight for a pixel of the B anchor frame, a t-wt metric corresponding to a temporal blending weight for a pixel of the interpolated frame, and an s-wt metric corresponding to a spatial blending weight for a pixel of the interpolated frame. The nature and use of these metrics will be explained in more detail in the following discussion, with reference to FIGS. 3-5.

At 212, individual pixels of interpolated frames are filtered based at least in part on the filter metrics 210, to produce filtered interpolated pixels and frames 214. The filtered interpolated frames 214 may then be used as intermediate frames $IF_x$ in the interpolated video stream 108.

Pixel Filters

Figure 3:
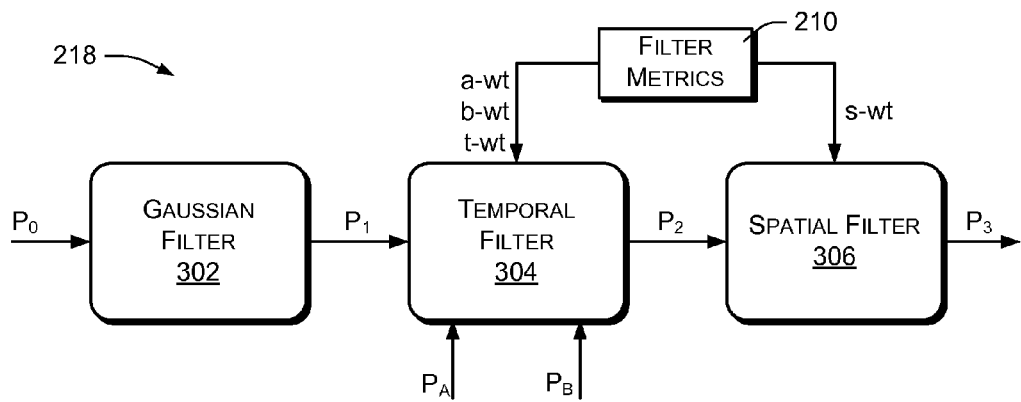
FIG. 3 is a block diagram illustrating the application of filters to a pixel of an interpolated video frame.

FIG. 3 illustrates an example implementation of the pixel filters 118, which may be configured to perform the action 212 of FIG. 2. In this example, the pixel filters 118 include a Gaussian filter 302, a temporal filter 304, and a spatial filter 306. The filters are configured in sequence, so that the temporal filter 304 receives the output of the Gaussian filter 302, and the spatial filter 306 receives the output of the temporal filter 304. Each pixel of the interpolated frame is acted upon separately by the filters 118.

The Gaussian filter 302 receives an interpolated pixel $P_0$ from the interpolation engine 110. The Gaussian filter 302 processes the interpolated pixel $P_0$ to generate a first filtered pixel, which is referred to herein as pixel $P_1$.

The Gaussian filter 302 is configured to fill "holes" in an interpolated image $IF_x$, at pixel locations where the interpolation engine 110 has been unable to calculate pixel values because of divergences at object boundaries and aperture effects in low detail regions. The Gaussian filter 302 is configured to generate a pixel based on an 11×11 pixel block centered at the pixel of interest.

As an alternative to the Gaussian filter 302, in-painting may be used to fill pixel holes.

The temporal filter 304 receives a motion-interpolated pixel of the interpolated video frame $IF_x$, which in this example comprises the pixel $P_1$ that has been processed by the Gaussian filter 302. The temporal filter 304 blends the received pixel $P_1$ with one or more anchor pixels $P_A$ and $P_B$ of the anchor frames A and B, respectively, to produce a temporally filtered pixel $P_2$. The anchor pixels $P_A$ and $P_B$ are those pixels of the anchor frames A and B that correspond in position to the motion-interpolated pixel $P_0$ of the interpolated video frame $IF_x$.

The temporal filter 304 applies relative blending weights to the anchor pixels $P_A$ and $P_B$ and the Gaussian-filtered pixel $P_1$ based on the filter metrics 210. In this example, the a-wt and b-wt metrics specify the relative weighting of the anchor pixels $P_A$ and $P_B$, respectively.

In the described embodiment, each blending weight ranges from zero to one, indicating a weight as a fraction or percentage of one. The a-wt and b-wt metrics are specified as being relative to each other, so that a-wt and b-wt sum to the value one: a-wt+b-wt=1. In an embodiment, a-wt may be explicitly specified, and b-wt may be calculated as b-wt=1−a-wt.

The t-wt metric specifies the blending weight of the motion-interpolated pixel $P_1$ relative to the previously blended anchor pixels $P_A$ and $P_B$. The t-wt metric is specified as a value ranging from zero to one, indicating a weight as a fraction or percentage of one.

Blending weights can be specified in different ways in different embodiments. For example, blending weights may specify the relative weights of the $P_b$ $P_A$ and $P_B$ pixels, relative to each other.

Figure 4:
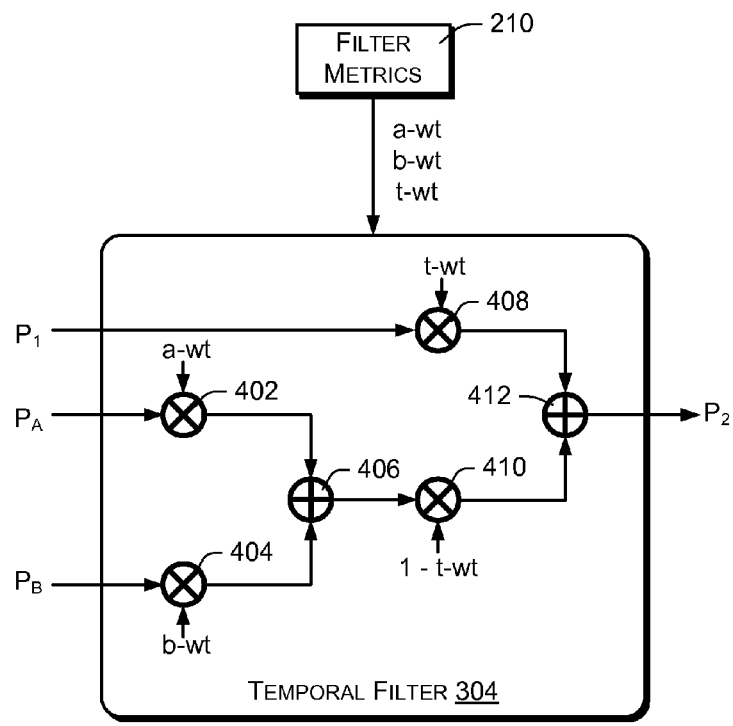
FIG. 4 is a block diagram illustrating an example implementation of a temporal filter.

FIG. 4 illustrates an example implementation of the temporal filter 304. The anchor pixel $P_A$ is multiplied by the a-wt metric at 402. The anchor pixel $P_B$ is multiplied by the b-wt metric at 404. The resulting pixel values are summed at 406 to produce a blended pixel based on the anchor pixels $P_A$ and $P_B$.

The interpolated pixel $P_1$ is multiplied by the t-wt metric at 408. The blended value of $P_A$ and $P_B$ is multiplied by 1−t-wt at 410. The results of the multiplications 408 and 410 are summed at 412 to produce the temporally filtered pixel $P_2$.

Except for certain situations, the a-wt and b-wt metrics are specified in accordance with the temporal position of the interpolated video frame $IF_x$ relative to the first and second anchor frames A and B. Thus, if the current interpolated video frame $IF_x$ represents a point in time at 25% of the temporal distance from anchor frame A to anchor frame B, a-wt=0.75 and b-wt=0.25.

The a-wt and b-wt metrics may be calculated differently if the current pixel $P_1$ is within a region of the current video frame that has been determined to be an occlusion or reveal region. In this case, a-wt and b-wt are calculated based on an evaluated reliability of motion tracking. If the object tracking is evaluated as being unreliable, a-wt and b-wt are calculated as described above. However, if object tracking with respect to the current pixel is deemed to have been reliable, the a-wt and b-wt metrics are specified depending on whether the current pixel has been occluded (visible in A, not visible in B) or revealed (visible in B, not visible in A):

if the pixel is part of an occluded region, a-wt=1 and b-wt=0; or if the pixel is part of a revealed region, a-wt=0 and b-wt=1.

The t-wt metric is specified depending on the evaluated quality of interpolation with respect to the current pixel, as indicated by the FOM 116. For example, t-wt may have an inverse relationship with the FOM 116 so that t-wt increases with decreasing FOM values and decreases with increasing FOM values. In some embodiments, the t-weight may have an inversely proportional relationship with the FOM 116.

Returning to FIG. 3, the spatial filter 306 is applied to improve the spatial coherence of neighborhood pixels subsequent to the temporal filer 304, and to decrease perceptible halo effects. The strength s-wt of the spatial filter may depend on the FOM 116 and/or temporal weight t-wt of the temporal filter 304. Generally, higher degrees of spatial filtering are applied as the evaluated interpolation quality decreases. Thus, there may be an inverse relationship between evaluated interpolation quality and the strength of the spatial filtering.

Figure 5:
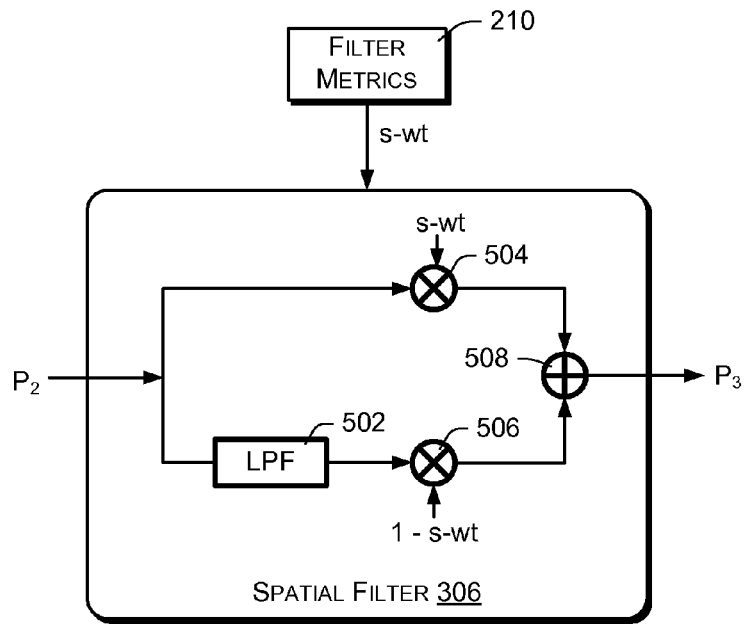
FIG. 5 is a block diagram illustrating an example implementation of a spatial filter.

FIG. 5 illustrates an example implementation of the spatial filter 306. The temporally filtered pixel $P_2$ is filtered by a low-pass filter 502 based on an 11×11 block of pixels of the current interpolated video frame $IF_x$, centered on the current pixel $P_2$. $P_2$ is multiplied by s-wt at 504, the filtered $P_2$ is multiplied by 1−s-wt at 506, and the results are summed at 508 to produce the output pixel value $P_3$, which is substituted in the for the original motion-interpolated pixel $P_1$ of the motion-interpolated frame of the original video stream.

Evaluating Interpolation Quality

Motion compensation schemes typically map destination pixels in an anchor frame to their source pixels in an adjacent anchor frame. In the case of bidirectional motion compensation, this results in two pixel motion maps. One maps from anchor frame A to anchor frame B, and the other maps from anchor frame B to anchor frame A.

Interpolation quality of a pixel in an interpolated frame may be evaluated by comparing a pixel resulting from forward motion compensation to the same pixel resulting from backward motion compensation. The absolute difference between these two pixel values may be used as an indication of interpolation quality.

Motion compensation schemes may also involve identifying occlusion and reveal regions. Because all pixels in anchor frame A are motion-mapped to pixels in anchor frame B, it follows that the set of pixels that are left un-mapped in anchor frame B are those pixels that are visible in B only. These pixels are identified as revealed pixels.

Similarly, because all pixels in anchor frame B are motion-mapped to pixels in anchor frame A, it follows that the set of pixels that are left un-mapped in anchor frame A are those pixels that are visible in A only. These pixels are identified as occluded pixels.

Areas of reveal and occlusion are identified together as occlusion/reveal areas. The motion of occlusion/reveal areas can be used to identify a foreground object, assuming that the foreground object is moving.

In particular, motion of an occlusion/reveal area may be tracked as follows. First, dominant motion vectors in the local neighborhood (to the left and right) of the occlusion/reveal area are detected. These can be represented as fgmv and bgmv, corresponding to foreground and background motion vectors, respectively. Second, the sum of absolute differences (SAD) for motion vectors fgmv and bgmv to track motion of the occlusion/reveal surface is computed. Given that the occlusion/reveal region moves with the foreground object, the SAD of the foreground motion vector (SAD(fgmv)) is less than the SAD of the background motion vector (SAD(bgmf)).

A measure of interpolation quality can be derived from these SAD values. Specifically, interpolation quality may be evaluated as increasing when:

SAD(fgmv) is low, and

SAD(bgmv)−SAD(fgmv) is high (provided fgmv is different than bgmv).

Example Computing System

FIG. 6 illustrates an exemplary computing system 500 that is usable to implement a video system in accordance with various embodiments. The computing system 600 may be configured as any suitable computing device capable of implementing a video system. According to various non-limiting examples, suitable computing devices may include personal computers (PCs), servers, server farms, datacenters, tablet computers, smartphones, personal data assistants, game consoles, combinations of these, or any other computing device(s) capable of storing and executing all or part of a video service.

In one example configuration, the computing system 600 comprises one or more processors 602 and memory 604. The memory 604 may store program instructions that are loadable and executable on the processor(s) 602, as well as data generated during execution of, and/or usable in conjunction with, these programs. In the illustrated example, the memory 604 includes the interpolation engine 110. Some or all of the interpolation functions of the interpolation engine 110 may be performed by one or more video processor(s) 606.

The memory 604 also includes the interpolation quality checker 114 and the pixel filters 118, which are configured to perform as described above.

Depending on the configuration and type of computing system used, the memory 604 may include volatile memory (such as random access memory (RAM)) and/or non-volatile memory (such as read-only memory (ROM), flash memory, etc.). The memory 604 may also include additional removable storage and/or non-removable storage including, but not limited to, flash memory, magnetic storage, optical storage, and/or tape storage that may provide non-volatile storage of computer readable instructions, data structures, program modules, and other data.

The memory 604 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Furthermore, although FIGS. 1 and 6 assign functional responsibilities to discrete logical elements or components for purposes of discussion, the described functionality may be implemented in various different ways, using various different programmatic and/or logical architectures and configurations, including the use of different functional elements.

The description uses the phrases "in an embodiment," "in embodiments," or similar language, which may each refer to one or more of the same or different embodiments. Furthermore, the terms "comprising," "including," "having," and the like, as used with respect to embodiments of the present disclosure, are synonymous.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This disclosure is intended to cover any adaptations or variations of the embodiments discussed herein. Therefore, it is manifestly intended that embodiments described herein be limited only by the claims and the equivalents thereof.

What is claimed is:

1. A method comprising:
producing, via a processor, a motion-interpolated pixel of an interpolated video frame, wherein the motion-interpolated pixel is based at least in part on a pair of anchor video frames;
determining, via the processor, an interpolation quality value for the motion-interpolated pixel;
blending, via the processor, the motion-interpolated pixel with one or more anchor pixels of the pair of anchor video frames to produce a temporally filtered pixel, wherein the one or more anchor pixels correspond in position to the motion-interpolated pixel of the interpolated video frame; and
substituting, via the processor, the temporally filtered pixel for the motion-interpolated pixel in the interpolated video frame.

2. The method of claim 1, wherein blending the motion-interpolated pixel with the one or more anchor pixels comprises weighting the motion-interpolated pixel relative to the one or more anchor pixels based at least in part on the interpolation quality value of the motion-interpolated pixel.

3. The method of claim 1, further comprising spatially filtering the temporally filtered pixel based on pixels that surround the temporally filtered pixel in the interpolated video frame.

4. The method of claim 1, further comprising Gaussian filtering individual pixels of the interpolated video frame prior to the blending.

5. The method of claim 1, further comprising:
blending a first anchor pixel and a second anchor pixel to produce a blended anchor pixel, wherein the first anchor pixel is from a first of the pair of anchor frames and the second anchor pixel is from a second of the pair of anchor frames, and wherein the first and second anchor pixels correspond in position to the motion-interpolated pixel of the interpolated video frame,
wherein blending the motion-interpolated pixel with the one or more anchor pixels comprises blending the motion-interpolated pixel with the blended anchor pixel.

6. The method of claim 5, wherein blending the first and second anchor pixels comprises weighting the first and second anchor pixels in accordance with a temporal position of the interpolated video frame relative to the first and second anchor frames.

7. The method of claim 5, wherein blending the first and second anchor pixels comprises weighting the first and second anchor pixels based at least in part on (i) a temporal position of the interpolated video frame relative to the first and second anchor frames, and (ii) whether the motion-interpolated pixel is within an occluded or revealed region of the interpolated video frame.

8. One or more computer-readable storage media storing a plurality of instructions executable by one or more processors of a computing system to cause the computing system to perform actions comprising:
producing a motion-interpolated pixel of an interpolated video frame, wherein the motion-interpolated pixel is based at least in part on a pair of anchor video frames;
determining an interpolation quality value for the motion-interpolated pixel;
blending the motion-interpolated pixel with one or more anchor pixels of the pair of anchor video frames to produce a temporally filtered pixel, wherein the one or more anchor pixels correspond in position to the motion-interpolated pixel of the interpolated video frame; and
substituting the temporally filtered pixel for the motion-interpolated pixel in the interpolated video frame.

9. The one or more computer-readable storage media of claim 8, wherein blending the motion-interpolated pixel with the one or more anchor pixels comprises weighting the motion-interpolated pixel relative to the one or more anchor pixels based at least in part on the interpolation quality of the motion-interpolated pixel.

10. The one or more computer-readable storage media of claim 8, the actions further comprising spatially filtering the temporally filtered pixel based on pixels that surround the temporally filtered pixel in the interpolated video frame.

11. The one or more computer-readable storage media of claim 8, the actions further comprising Gaussian filtering individual pixels of the interpolated video frame prior to the blending.

12. The one or more computer-readable storage media of claim 8, the actions further comprising:
blending a first anchor pixel and a second anchor pixel to produce a blended anchor pixel, wherein the first anchor pixel is from a first of the pair of anchor frames and the second anchor pixel is from a second of the pair of anchor frames, and wherein the first and second anchor pixels correspond in position to the motion-interpolated pixel of the interpolated video frame,
wherein blending the motion-interpolated pixel with the one or more anchor pixels comprises blending the motion-interpolated pixel with the blended anchor pixel.

13. The one or more computer-readable storage media of claim 12, wherein blending the first and second anchor pixels comprises weighting the first and second anchor pixels in accordance with a temporal position of the interpolated video frame relative to the first and second anchor frames.

14. The one or more computer-readable storage media of claim 12, wherein blending the first and second anchor pixels comprises weighting the first and second anchor pixels based at least in part on (i) a temporal position of the interpolated video frame relative to the first and second anchor frames, and (ii) whether the motion-interpolated pixel is within an occluded or revealed region of the interpolated video frame.

15. A video system, comprising:
a conversion engine configured to generate interpolated frames for up-scaling an original video stream;
wherein the conversion engine is further configured to:
produce a motion-interpolated pixel of an interpolated video frame, wherein the motion-interpolated pixel is based at least in part on a pair of anchor video frames of the original video stream;
determine an interpolation quality value for the motion-interpolated pixel;
blend the motion-interpolated pixel with one or more anchor pixels of the pair of anchor video frames to produce a temporally filtered pixel, wherein the one or more anchor pixels correspond in position to the motion-interpolated pixel of the interpolated video frame; and
substitute the temporally filtered pixel for the motion-interpolated pixel in the interpolated video frame.

16. The video system of claim 15, wherein blending the motion-interpolated pixel with the one or more anchor pixels comprises weighting the motion-interpolated pixel relative to the one or more anchor pixels based at least in part on the interpolation quality of the motion-interpolated pixel.

17. The video system of claim 15, the conversion engine being further configured to spatially filter the temporally filtered pixel based on pixels that surround the temporally filtered pixel in the interpolated video frame.

18. The video system of claim 15, the conversion engine being further configured to:
blend a first anchor pixel and a second anchor pixel to produce a blended anchor pixel, wherein the first anchor pixel is from a first of the pair of anchor frames and the second anchor pixel is from a second of the pair of anchor frames, and wherein the first and second anchor pixels correspond in position to the motion-interpolated pixel of the interpolated video frame,
wherein blending the motion-interpolated pixel with the one or more anchor pixels comprises blending the motion-interpolated pixel with the blended anchor pixel.

19. The video system of claim 18, wherein blending the first and second anchor pixels comprises weighting the first and second anchor pixels in accordance with a temporal position of the interpolated video frame relative to the first and second anchor frames.

20. The video system of claim 18, wherein blending the first and second anchor pixels comprises weighting the first and second anchor pixels based at least in part on (i) a temporal position of the interpolated video frame relative to the first and second anchor frames, and (ii) whether the motion-interpolated pixel is within an occluded or revealed region of the interpolated video frame.

* * * * *